US010906667B2

(12) United States Patent
Kohn et al.

(10) Patent No.: US 10,906,667 B2
(45) Date of Patent: Feb. 2, 2021

(54) TRANSPORT AND HOISTING STRUCTURE FOR A TURBOMACHINE

(71) Applicant: SAFRAN AIRCRAFT ENGINES, Paris (FR)

(72) Inventors: Thierry Kohn, Moissy-Cramayel (FR); Stephane Baucher, Moissy-Cramayel (FR); Damien Cesar, Moissy-Cramayel (FR); Alexandre Dervaux, Moissy-Cramayel (FR); Franck Dubreucq, Moissy-Cramayel (FR); Thibaud Mangin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 709 days.

(21) Appl. No.: 15/115,837

(22) PCT Filed: Feb. 2, 2015

(86) PCT No.: PCT/FR2015/050228
§ 371 (c)(1),
(2) Date: Aug. 1, 2016

(87) PCT Pub. No.: WO2015/114276
PCT Pub. Date: Aug. 6, 2015

(65) Prior Publication Data
US 2017/0166331 A1    Jun. 15, 2017

(30) Foreign Application Priority Data

Feb. 3, 2014    (FR) ...................................... 14 00286

(51) Int. Cl.
*B64F 5/10*    (2017.01)
*B65D 85/68*    (2006.01)
(Continued)

(52) U.S. Cl.
CPC .................. *B64F 5/10* (2017.01); *B62B 3/04* (2013.01); *B64F 5/50* (2017.01); *B65D 19/44* (2013.01);
(Continued)

(58) Field of Classification Search
CPC ...... B64F 5/50; B64F 5/10; B64F 5/40; F01D 25/285; B65D 2585/6877; F02C 7/20
(Continued)

(56) References Cited

U.S. PATENT DOCUMENTS 2,703,252 A    3/1955    Blackwell
2,867,334 A    1/1959    Aiken et al.
(Continued)

OTHER PUBLICATIONS

International Search Report dated Apr. 29, 2015 for International Application No. PCT/FR2015/050228.

*Primary Examiner* — Orlando E Aviles
*Assistant Examiner* — Mahdi H Nejad
(74) *Attorney, Agent, or Firm* — Womble Bond Dickinson (US) LLP (57) ABSTRACT

A method for transporting a turbine engine held by a transport kit by a carriage. The transport kit connected to a connection member hoists the engine to connect to an aircraft fuselage. The transport kit is a structure which includes a hoisting interface (328) arranged on a rigid hoisting arm (318) which extends over the turbine engine and is connected to a rigid transport arm (316) which extends over a lateral side of the turbine engine. The transport arm is connected to at least two engine mounts (340) solid with the turbine engine. The transport arm (316), or one of the engine mounts connected to the transport arm, includes a transport interface (324) that can be supported by a bearing element (332) of a truck (326) used for transporting the turbine engine.

1 Claim, 4 Drawing Sheets

(51) Int. Cl.
  *F01D 25/28* (2006.01)
  *B64F 5/50* (2017.01)
  *B62B 3/04* (2006.01)
  *B65D 19/44* (2006.01)
  *B66C 1/10* (2006.01)

(52) U.S. Cl.
  CPC .............. *B65D 85/68* (2013.01); *B66C 1/107* (2013.01); *F01D 25/285* (2013.01); *B65D 2585/6877* (2013.01); *F05D 2220/323* (2013.01); *F05D 2230/68* (2013.01)

(58) Field of Classification Search
  USPC .......................... 29/281.1; 414/589; 206/319
  See application file for complete search history.

(56) References Cited

U.S. PATENT DOCUMENTS

| | | | |
|---|---|---|---|
| 2,944,331 A | 7/1960 | Munn et al. | |
| 3,146,016 A | 8/1964 | Daymon | |
| 5,722,512 A * | 3/1998 | Lilja | B64F 5/50 187/244 |
| 6,170,141 B1 * | 1/2001 | Rossway | F01D 25/285 206/319 |
| 6,546,616 B2 * | 4/2003 | Radowick | B23Q 3/186 269/58 |
| 2003/0102405 A1 * | 6/2003 | McEvoy | B64D 29/04 244/54 |
| 2008/0011932 A1 * | 1/2008 | Stretton | B66C 1/10 248/544 |
| 2009/0001702 A1 | 1/2009 | Miller | |
| 2009/0104015 A1 * | 4/2009 | Tardif | B65B 33/04 414/809 |
| 2012/0223467 A1 * | 9/2012 | Swan | F01D 25/285 269/37 |
| 2015/0314892 A1 * | 11/2015 | DesJardien | B64F 5/50 29/559 |
| 2018/0142576 A1 * | 5/2018 | Dervaux | B64F 5/50 |
| 2018/0283215 A1 * | 10/2018 | Dubois | F01D 25/24 |

* cited by examiner

TRANSPORT AND HOISTING STRUCTURE FOR A TURBOMACHINE

TECHNICAL FIELD

The present invention relates to a transport and hoisting structure for a turbine engine or a turbine engine module, in particular for an aircraft.

PRIOR ART

The prior art comprises the documents US-A1-2009/001702, U.S. Pat. Nos. 2,867,334, 2,944,331, 2,703,252, 3,146,016 and US-A1-2009/104015.

In the prior art, a turbine engine is transported by means of a transport carriage. This transport carriage makes it possible for example to move the turbine engine (horizontally) in a hanger, after having removed the turbine engine from an aircraft or before it is mounted on the aircraft. The turbine engine is equipped with dedicated interfaces for cooperating with the transport carriage, these interfaces being referred to as transport interfaces.

Mounting the turbine engine on the aircraft, and in particular on the strut connecting the turbine engine to the aircraft, requires an operation of hoisting the turbine engine, that is to say an operation of lifting (vertical movement) the turbine engine in order to extract it from the transport carriage. For this purpose, the turbine engine is equipped with dedicated interfaces for cooperating with a lifting member, these interfaces being referred to as hoisting interfaces.

Conventionally, the transport interfaces are situated in a bottom or lower part of the turbine engine and the hoisting interfaces are situated in a top or upper part thereof. In general, the transport interfaces are four in number, two at the front and two at the rear of the turbine engine, and the hoisting interfaces are also four in number, two at the front and two at the rear of the turbine engine. A turbine engine is thus equipped with eight separate interfaces, which must remain free, which considerably constrains the space allocated to certain items of equipment of the turbine engine, such as in particular electrical harnesses.

It has already been proposed to solve this problem of space requirement by equipping a turbine engine with interfaces used both for hoisting and transport, that is to say with interfaces having a dual hoisting and transport function. The patent application EP-A1-0 089 866 describes in this regard a combined attachment device for transporting and hoisting a turbine engine, this device comprising means for fixing to the transport carriage and hoisting means for hoisting the turbine engine. The fixing and hoisting means are connected to the same interfaces of the turbine engine, which are thus transport and hoisting interfaces.

In the prior art, the technical transport and hoisting solutions are designed for a turbine engine intended to be mounted on the wing of an aircraft. The turbine engine is suspended from the wing by means of a strut that is situated at 12 o'clock by analogy with the dial on a clock. The turbine engine is thus equipped at 12 o'clock with suspension interfaces dedicated to the connection of the turbine engine to the strut. These suspension interfaces are separate from the transport and hoisting interfaces and therefore do not interfere with the hoisting operation. This is because the transport and hoisting interfaces, which are situated on the sides of the turbine engine (for example at 8 o'clock and 10 o'clock), do not interfere with the fixing of the strut to the suspension interfaces situated at 12 o'clock.

However, these solutions are not suitable when the turbine engine is intended to be mounted on a side of the aircraft fuselage. This is because, in this case where the suspension interfaces of the turbine engine are situated on a side of the latter, the operating of hoisting the turbine engine is more complex since the hoisting means may interfere with the connection of the strut to the suspension interfaces.

There therefore exists a real need for a technology allowing a turbine engine intended to be fixed to a side of the fuselage of an aircraft to be equipped with interfaces serving both for the hoisting and the transport and optionally also for the suspension of this turbine engine.

The present invention provides a simple, effective and economical solution to this requirement.

DISCLOSURE OF THE INVENTION

The invention proposes a transport and hoisting structure, installed on a turbine engine or on a turbine engine module, which has a central longitudinal axis forming an angle of between 0° and 10° with respect to the horizontal, the structure comprising:
- at least two transport interfaces rigidly connected to the turbine engine, situated on either side of the turbine engine in relation to a vertical midplane P comprising said central longitudinal axis, and each able to be supported removably by a carrier element of a carriage transporting the turbine engine,
- at least one hoisting interface rigidly connected to the turbine engine, able to be connected to a lifting member intended to hoist the turbine engine and to release it from the transport carriage, and
- engine mounts secured to the turbine engine, characterised in that said at least one hoisting interface is disposed on a rigid hoisting arm that extends at least partly above the turbine engine and passes through said vertical midplane P, said hoisting arm being connected to a rigid transport arm, said transport arm being situated on only one side of the turbine engine in relation to the vertical midplane and being connected to at least two of said engine mounts, and in that the transport arm or one of the engine mounts connected to this transport arm comprises one of said at least two transport interfaces.

The structure according to the invention thus comprises the two transport and hoisting interfaces of the turbine engine, which are each carried by a rigid arm. The transport interface is carried by the transport arm, said transport arm carrying this interface either directly or by means of an engine mount. The hoisting interface is carried by the hoisting arm, which is connected to the transport arm.

The use of such arms allows the mounting of the turbine engine on a side of the fuselage of an aircraft. This is because the turbine engine is hoisted by means of the hoisting arm, which extends above the turbine engine and therefore does not interfere with the connection of a first side (for example left) of the turbine engine to the aircraft strut. In addition, the hoisting arm is connected to a transport arm that is connected to the turbine engine by means of engine mounts that are situated on only one of the sides of the turbine engine, namely its second side (right, in the aforementioned example). The transport arm thus lies only at this second side of the turbine engine and does not interfere with the connection of the first side of the turbine engine to the aircraft strut.

In other words, it is clear from the above that the hoisting arm is connected to a single transport arm situated on the same side of the turbine engine.

The structure according to the invention is therefore suited in particular but not exclusively to the mounting of a turbine engine on a side of the fuselage of an aircraft.

During its transport, the turbine engine has a central longitudinal axis forming an angle of between 0° and 10° with respect to the horizontal, that is to say the turbine engine is substantially horizontal or slightly inclined with respect to the horizontal.

The hoisting arm may be formed in a single piece with the transport arm. In a variant, the hoisting arm is fixed, preferably removably, to the transport arm.

According to one embodiment of the invention, the transport arm comprises a main rectilinear portion connected to a bottom rectilinear portion that forms an angle with the main rectilinear portion and is connected to a bottom engine mount secured to the turbine engine. This transport arm may comprise a top rectilinear portion that forms an angle with the main rectilinear portion and is connected to a top engine mount secured to the turbine engine.

Advantageously, the engine mounts, the transport interfaces and said at least one hoisting interface are situated substantially in the same transverse plane perpendicular to the vertical midplane P.

According to one embodiment of the invention, at least one first hoisting interface is disposed on the hoisting arm and at least one second hoisting interface is fixed to the turbine engine while being spaced apart axially from the first hoisting interface, and the structure further comprises a connection member that connects together the first and second hoisting interfaces as well as an attachment member mounted on said connection member, said attachment member being able to be connected to the lifting member.

The connection member may comprise a guide rail on which the attachment member can be moved in translation.

The present invention also relates to a transport and hoisting kit intended for installation on a turbine engine or a turbine engine module in order to form a transport and hoisting structure as described above, the kit comprising at least two rigid transport arms that are each connected or are able to be connected to at least two engine mounts, each transport arm or one of the engine mounts connected to each transport arm comprising a transport interface able to be supported by a carrier element of a transport carriage, one of the two transport arms further being connected to a rigid hoisting arm that comprises a hoisting interface able to be connected to a lifting member intended to hoist the turbine engine.

The hoisting arm may be formed in a single piece with the transport arm to which it is connected. In a variant, the hoisting arm is fixed, preferably removably, to the transport arm to which it is connected.

Advantageously, the two transport arms are identical. They are thus interchangeable, and manufacture of the kit is simplified thereby.

According to one embodiment of the invention, each transport arm comprises a main rectilinear portion extended by a bottom rectilinear portion the forms an angle with the main rectilinear portion and is connected or is able to be connected to an engine mount. Each transport arm may comprise a top rectilinear portion connected to the main rectilinear portion, this top rectilinear portion forming an angle with the main rectilinear portion and being connected or able to be connected to an engine mount.

According to one embodiment of the invention, the kit comprises a second hoisting interface able to be fixed to the turbine engine, a connection member able to connect together the first and second hoisting interfaces, as well as an attachment member mounted on said connection member, said attachment member being able to be connected to a lifting member.

The present invention also relates to a rigid transport arm intended for a transport and hoisting kit as described above, this arm comprising a main rectilinear portion and two rectilinear portions, respectively bottom and top, that extend on the same side of the main rectilinear portion and each form an angle with this main part, each of these bottom and top rectilinear portions being connected or able to be connected to an engine mount, the main portion, the bottom portion or the engine mount connected to this bottom portion comprising a transport interface able to be supported by a carrier element of a transport carriage.

Finally, the present invention relates to a method for transporting and hoisting a turbine engine or a turbine engine module, in order to install it on either of the two lateral sides of the fuselage of an aircraft, the turbine engine comprising bosses for fixing at least four engine mounts that are symmetrical in pairs with respect to a vertical midplane P comprising a central longitudinal axis of the turbine engine, the method comprising the steps consisting of:
a) procuring a transport and hoisting kit as described above,
b1) fixing the engine mounts to the turbine engine fixing means,
b2) connecting a first one of the two transport arms of the kit to two engine mounts situated or intended to be situated on the same first side of the vertical midplane P, and b3) connecting a second one of the two transport arms of the kit to two engine mounts situated or intended to be situated on the same second side of the vertical midplane P, step b1) being performed before or after steps b2) and b3),
c) placing the turbine engine on a transport carriage, supporting the transport interface of each of the two transport arms by a carrier element of the transport arms by a carrier element of the transport carriage, and transporting the carriage as far as a location from which the turbine engine is to be hoisted,
d) connecting a lifting member to the hoisting interface of the hoisting arm, and hoisting the turbine engine in order to release it from the transport carriage,
e) removing from the turbine engine whichever of the two transport arms is not connected to the hoisting arm, so as to make available the corresponding bosses on the turbine engine or the two engine mounts fixed to these bosses, and
f) hoisting the turbine engine by means of said lifting member, so that the bosses or engine mounts available are facing the lateral side of the aircraft fuselage on which the turbine engine is to be installed.

DESCRIPTION OF THE FIGURES

The invention will be better understood and other details, features and advantages of the invention will emerge from a reading of the following description given by way of non-limitative example with reference to the accompanying drawings, in which.

DETAILED DESCRIPTION

Figure 1:
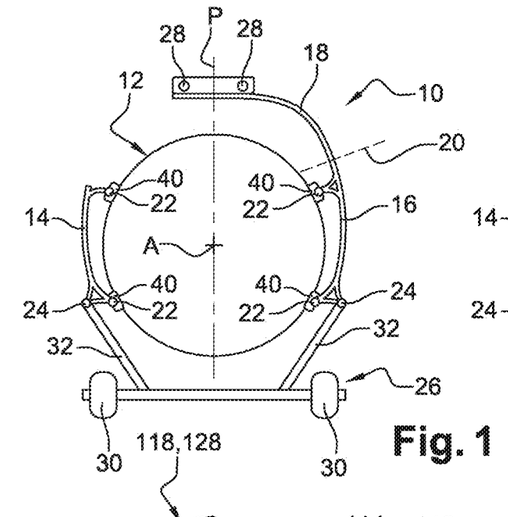
FIG. 1 is a highly schematic view of a turbine engine equipped with a transport and hoisting structure according to the invention, this structure cooperating with a transport carriage of the turbine engine.
Figure 2:
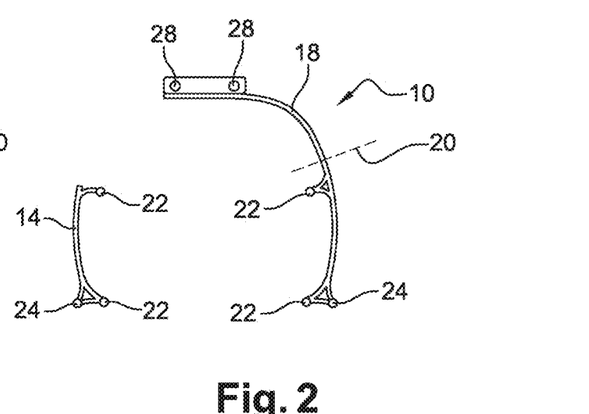
FIG. 2 is a is a highly schematic view of the transport and hoisting structure (forming a kit) of FIG. 1.

Reference is made first of all to FIGS. 1 and 2, which depict highly schematically a first embodiment of a transport and hoisting structure 10 according to the invention for a turbine engine 12 or a turbine engine module.

Conventionally, a turbine engine 12 comprises an engine surrounded by a nacelle, the engine comprising, from upstream to downstream in the direction of flow of the gases in the engine, a fan, at least one compression stage, a combustion chamber, at least one turbine stage, and a pipe for ejecting the combustion gases.

The structure 10 according to the invention can be designed to transport and hoist a turbine engine 12 or only a part or a module of this turbine engine, such as its engine for example.

FIG. 1 depicts the structure 10 installed on the turbine engine 12 and FIG. 2 depicts the structure 10 detached from the turbine engine, this detached structure 10 then being able to be assimilated to a kit.

The structure 10 according to the invention comprises essentially three parts referred to as arms, two transport arms 14, 16 and a hoisting arm 18, one of the transport arms 16 being secured to the hoisting arm 18. The connection zone between the arms 16, 18 is depicted schematically by the broken lines 20.

The transport arms 16 are substantially identical. They each comprise interfaces 22, here two in number, for connection to the turbine engine 12 (referred to as engine interfaces 22), and an interface 24 for connection to a transport carriage 26 (referred to as a transport interface 24). The hoisting arm 18 comprises at least one interface 28 for connection to a lifting member (not shown—referred to as the hoisting interface 28).

The central longitudinal axis of the turbine engine 12 is denoted A and the vertical midplane of the turbine engine passing through this axis A is denoted P. It is noted that the engine interfaces 22 are diametrically opposed in pairs with respect to the axis A and that the interfaces situated on one side of the turbine engine 12 are symmetrical with respect to the interfaces 22 situated on the other side of the turbine engine 12, in relation to the plane P. Two interfaces 22 are situated at the bottom part and the other two interfaces 22 are situated at the top part. It will also be noted that the transport interfaces 24 are positioned symmetrically with respect to the plane P. Each transport 14, 16 lies on only one side of the turbine engine 12 with respect to the plane P, the two arms 14, 16 also being disposed symmetrically with respect to this plane when they are installed on the turbine engine 12. The hoisting arm 18 extends upwards and above the turbine engine 12, from a top end of the transport arm 16, and passes through the plane P. In the case where the hoisting arm 18 comprises two hoisting interfaces 28, these can be positioned symmetrically with respect to the plane P, as in the example depicted.

The two engine interfaces 22 of each transport arm 14, 16 are situated respectively at the top and bottom ends of the arm. The transport interface 24 of each transport arm 14, 16 is situated at the bottom end of the arm.

The transport carriage 26 is here equipped with wheels 30 to facilitate its movement in a horizontal plane substantially parallel to the axis A. The carriage 26 comprises carrier elements 32 cooperating with the transport interfaces 24 of the transport arms 14, 16. Each carrier element 32 has an elongate rectilinear shape. It extends upwards from the carriage 26 and it is its top free end that cooperates with the transport interface 24 of a transport arm 14, 16.

As will be described in more detail hereinafter, with reference to more detailed embodiments of the invention, the engine interfaces 22 and the transport interface 24 of each transport arm 14, 16 can be formed directly on this arm or can be carried by a part, referred to as the engine support 40, connected to the arm 14, 16 and intended to be secured to the turbine engine 12.

The engine supports 40, the transport interfaces 24 and the hoisting interfaces 28 are here situated substantially in the same transverse plane perpendicular to the plane P, this transverse plane being the plane of the drawing in FIG. 1.

Figures 3, 4:
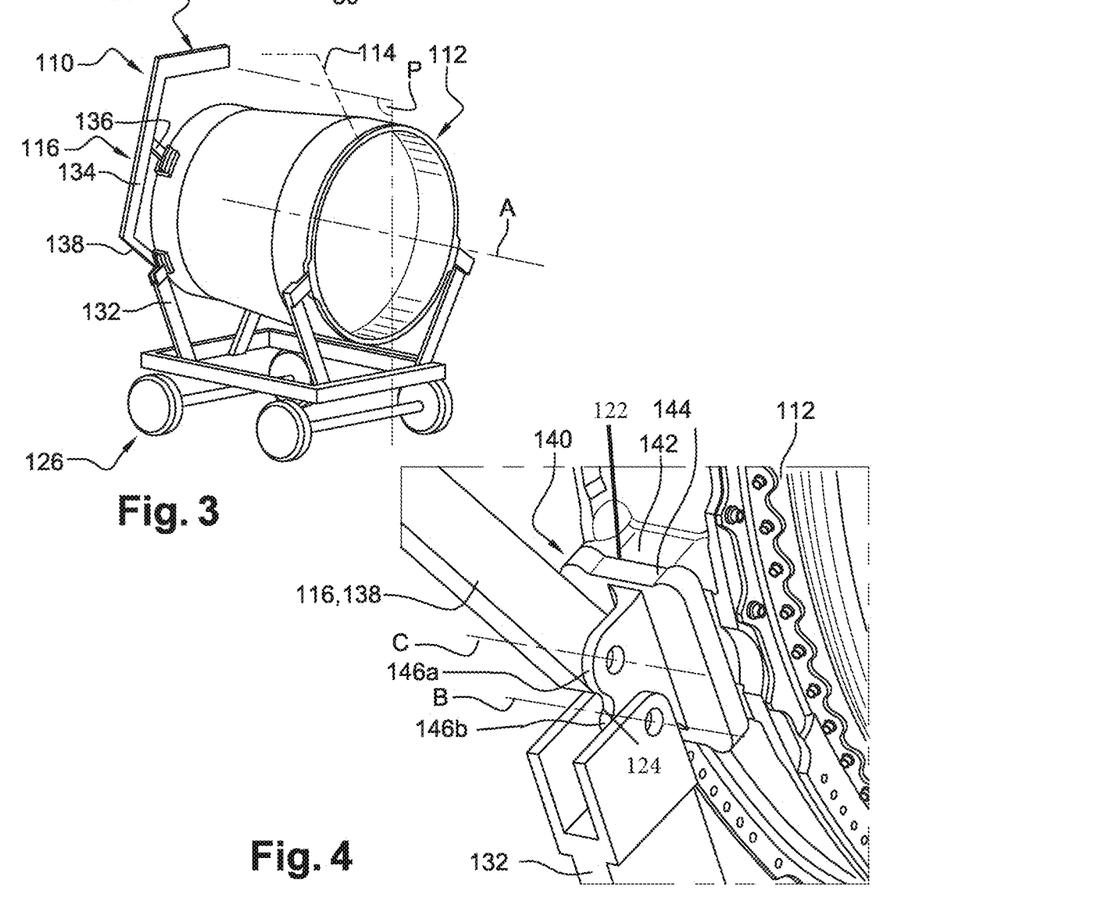
FIG. 3 is schematic view in perspective of a turbine engine equipped with an embodiment of a transport and hoisting structure according to the invention, this structure cooperating with a carriage transporting the turbine engine.
FIG. 4 is a view of a part of FIG. 3 to a larger scale.

Reference is made now to FIGS. 3 and 4, which depict an alternative to the first embodiment of a transport and hoisting structure according to the invention. The transport and hoisting structure 110 comprises a transport arm 116 formed in a single piece with a hoisting arm 118, in a similar fashion to the transport and hoisting arms 16, 18 described above.

The transport arm 116 comprises three rectilinear portions, respectively main 134, top 136 and bottom 138. This arm 116 here has a roughly "t" shape. Its main portion 134 extends on one side of the turbine engine 112 and is connected at its bottom end to the bottom portion 138 that extends from the main portion towards the turbine engine 112. The main 134 and bottom 138 portions form between them an angle, which is here around 70°-120°.

The main portion 134 is connected substantially at its middle to the top portion 136, which extends from the main portion towards the turbine engine. The main 134 and top 136 portions form between them an angle, which is here also around 70°-120°.

The portions 134, 136 and 138 of the transport arm 116 are formed in a single piece. Moreover, as described above in relation to the hoisting arm 18, the hoisting arm 118 extends upwards and above the turbine engine 12, from the top end of the main portion 134 of the transport arm 116, and passes through the plane P. The arms 116 and 118 can be produced from metal bars or cross members, which may be tubular.

The free end of each of the top 136 and bottom 138 portions of the transport arm 116 is connected to an associated engine mount 140 that is fixed to the turbine engine 112 (FIG. 4). The transport arm 116 is thus connected to two engine mounts 140 situated on the same side of the turbine engine, here the left-hand side in the example in question.

The turbine engine comprises bosses 142, here four in number, to each of which an engine mount 140 is applied and fixed. These bosses 142 are situated at the engine interfaces 22 described above with reference to FIGS. 1 and 2. For example, a boss 142 may consist of a metal block provided with flanks designed to be fixed by bolts or rivets to a flange on the turbine engine.

Each boss 142 comprises a planar external surface forming an interface to which the corresponding engine mount 140 is fixed. The engine mount 140 comprises a plate 144 applied to this external surface of the boss 142, the plate 144 comprising through orifices (not shown) for bolts to pass, which are aligned with through or threaded orifices in the boss 142, for fixing the engine mount 140 to the turbine engine 112.

The plate 144 of the engine mount 140 is connected to two clevises 146a, 146b for connection respectively to the transport arm 116 and to a carrier element 132 of the transport carriage 126, which is similar to the one 26 described above with reference to FIG. 1.

The clevises 146a, 146b are here formed by a lug projecting on the plate 144 and substantially perpendicular to the plate, this lug comprising two through orifices for mounting pivots (not shown) for articulating the transport arm 116 and the carrier element 132 of the carriage 126 respectively. The transport arm 116, and in particular the free end of its bottom portion 138, comprises a through orifice for mounting a first of these pivots, and the top end of the carrier element 132 comprises a through orifice for mounting the second pivot. The B, C of the pivots are substantially parallel to each other and are here substantially parallel to the axis A.

The plate 144 fixed to the turbine engine 112 forms an engine interface 122 and the clevis 146b connected to the carrier element 132 forms a transport interface 124, the engine interface 122 and transport interfaces 124 being similar to those described above with reference to FIGS. 1 and 2. The transport arm 116 as such therefore does not comprise a transport interface 124. In the present invention, a transport arm in general either comprises a transport interface integrated in the arm or is connected to a member such as an engine mount that comprises a transport interface.

In a variant, it is the clevis 146a connected to the transport arm 116, or the free end of the bottom portion 138 of the transport arm, that could be considered to form an engine interface. It is in particular the case in a variant embodiment of the invention, not shown, in which the engine mounts 140 would be formed in a single piece with the bosses 142 on the turbine engine. These bosses 142 would then be formed in a single piece with the devises 146a, 146b for connection to the transport arm 116 and to the carrier element 132 of the transport carriage 126.

In the example shown, the transport arm 116 is connected by the engine mounts 140 to an upstream longitudinal end of a turbine engine module 112, which comprises here a substantially cylindrical casing. The transport arm 116 extends on one side only of the turbine engine module 112 with respect to the plane P.

The transport carriage 126 comprises two carrier elements 132 at the front and two carrier elements 132 at the rear. The two front carrier elements 132 cooperate with the two front bottom engine mounts 140, that is to say those situated at the front of the turbine engine module and at a height lower than that of the axis A, and therefore support the front end of the turbine engine module 112. It should be noted that a second bottom engine mount 140, not visible in FIG. 3 but identical to the one shown in FIG. 4, is provided on the side of the module that is not visible (here the right-hand side). The two bottom engine mounts 140 are symmetrical with each other with respect to the plane P. The rear carrier elements 132 for their part cooperate with the rear end of the turbine engine module 112 and therefore support this rear end.

Moreover, the two front top engine mounts 140, that is to say those situated at the front of the turbine engine module and at a height higher than that of the axis A, are not necessarily identical to a bottom engine mount 140. In particular, a top engine mount 140 may comprise only one clevis 146a or 146b, suitable for connection to a suspension member connecting the turbine engine to the aircraft strut, the suspension member being for example like the one depicted under the reference 245 in FIG. 7. This is because the top engine mounts 140 are not used for connecting the carrier elements 132 of the transport carriage 126.

The hoisting arm 118 comprises here a top rectilinear portion that extends above the turbine engine module 112 and comprises the hoisting interface or interfaces 128 described above (and referenced 28 in FIGS. 1 and 2).

In a variant of the embodiment in FIGS. 3 and 4, it is possible to provide a second transport arm 114, not shown but similar to the transport arm 14 in FIG. 1. The second transport arm 114 then extends on the opposite side of the module, symmetrically with respect to the plane P. By providing the two transport interfaces 124 on the transport arms 114, 116 rather than on the engine mounts 140, the implementation obtained according to this variant becomes similar to that of FIG. 1.

Figure 5:
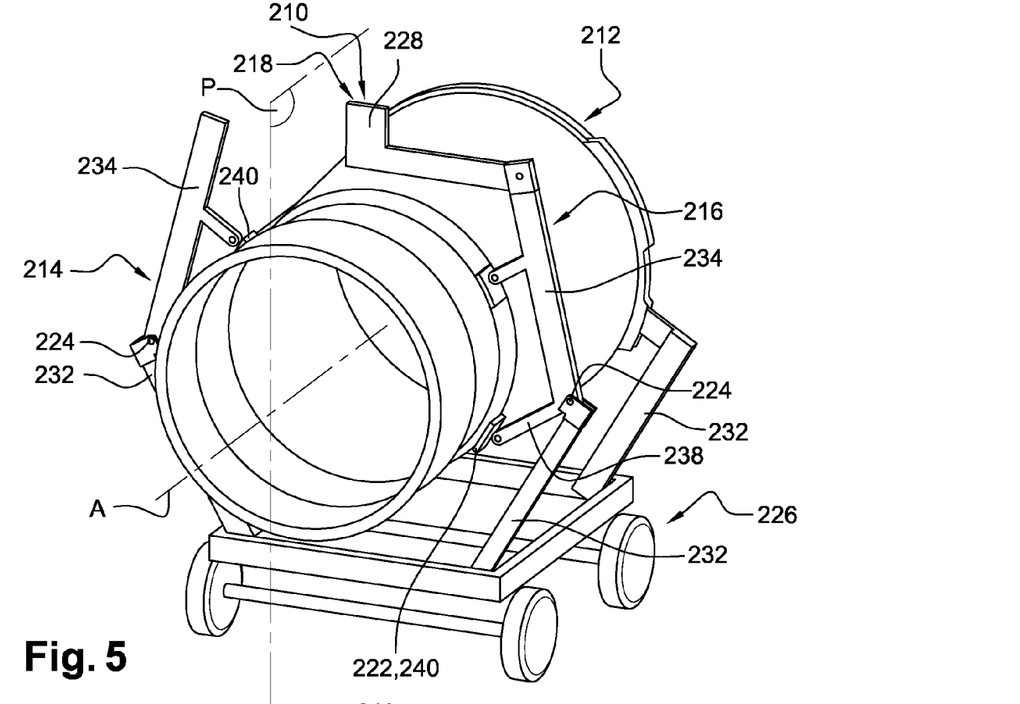
FIG. 5 is a schematic view in perspective of a turbine engine equipped with a variant embodiment of a transport and hoisting structure according to the invention, this structure cooperating with a carriage transporting the turbine engine.
Figure 6:
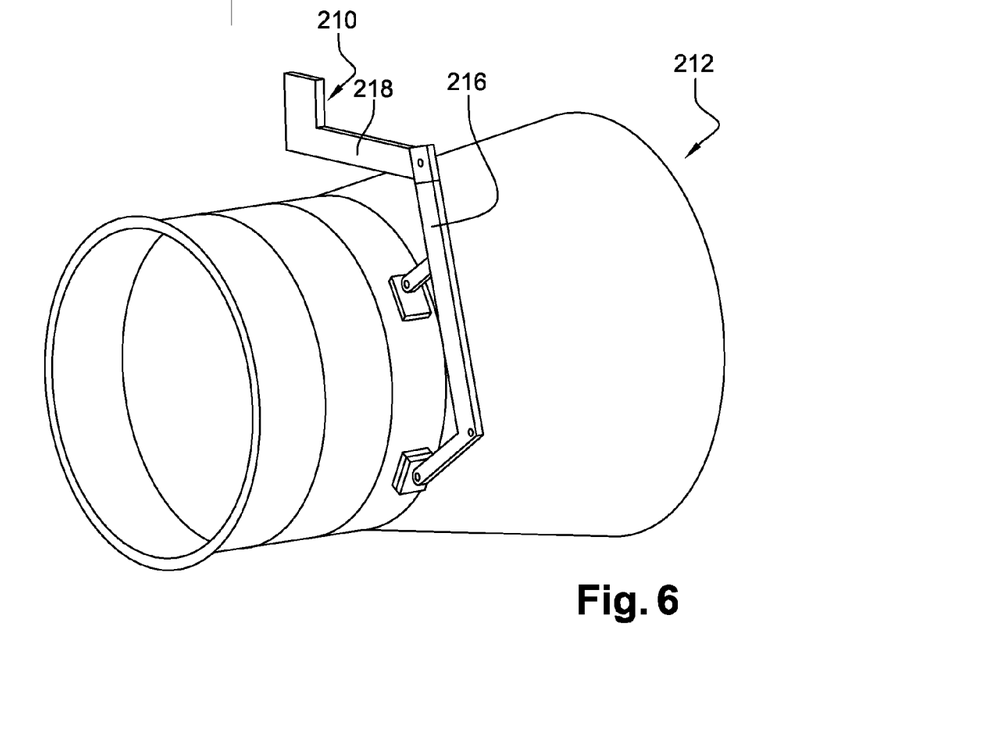
FIG. 6 is another schematic view in perspective of the turbine engine and of the transport and hoisting structure of FIG. 5, one of the transport arms of the structure having been removed from the turbine engine.
Figure 7:
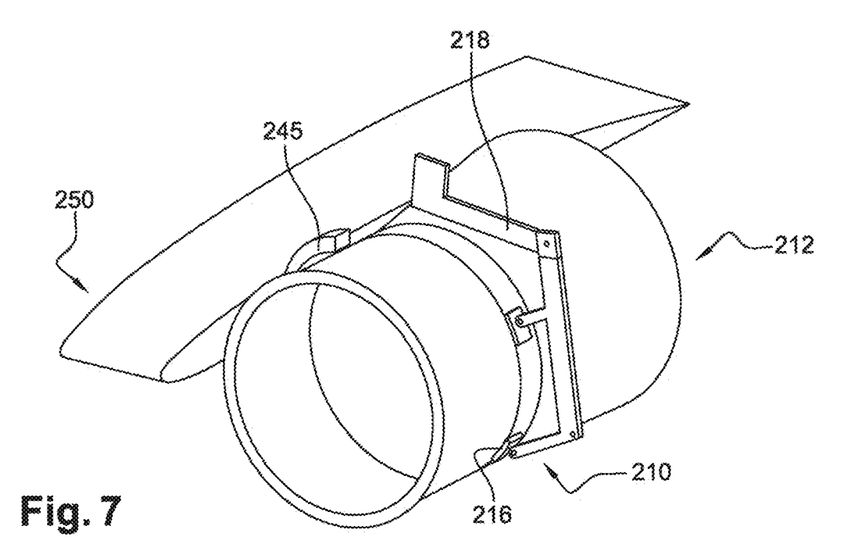
FIG. 7 is another schematic view in perspective of the turbine engine and of the transport and hoisting structure of FIG. 5, the turbine engine here being connected to a strut for connection to the fuselage of an aircraft.

The variant embodiment of the structure 210 according to the invention depicted in FIGS. 5 to 7 differs from the embodiment in FIGS. 3 and 4 essentially with respect to three points.

Firstly, the hoisting arm 218 is here not formed in a single piece with the transport arm 216 but is on the contrary fixed to the latter removable or detachably. The support arm 216 and the hoisting arm 218 can thus be dissociated from each other. Advantageously, the two transport arms 214, 216 of the structure 210 are identical, each transport arm 214, 216 comprising (at the top ends of their main portions 234) removable fixing means configured so as to cooperate with complementary means for fixing the hoisting arm 218. The hoisting arm 218 can thus be fixed equally well to one or other of the transport arms 214, 216 of the structure 210.

The other difference relates to the transport interfaces 224, which are no longer carried by the engine mounts 240 but by the transport arms 214, 216. The transport interface 224 of each transport arm 214, 216 is here situated in the connection zone of the main 234 and bottom 238 portions of this arm, and comprises a through orifice housing an articulation pivot of a top end of a carrier element 232 of the carriage 226, as described above. The engine mounts 240 still carry the engine interfaces 222.

Another difference relates to the form of the hoisting arm 218, which is here substantially in an L shape and comprises a substantially horizontal rectilinear portion, one longitudinal end of which is detachably connected to the support arm 216, and the opposite longitudinal end of which is connected to the bottom end of the a substantially vertical rectilinear portion. The top end of this substantially vertical portion may comprise the hoisting interface or interfaces 228 described above.

The structure 210 is here intended to transport a turbine engine module 212 that comprises, in addition to the casing depicted in FIGS. 3 and 4, a supplementary casing mounted in front of the first casing. The structure 210 installed on this module is at a distance from the longitudinal ends of the module, unlike FIGS. 3 and 4, in which the structure 110 is situated at the front end of the module.

A method for transporting and hoisting a turbine engine 212 in order to install it on one of the metal sides of the fuselage of an aircraft will now be described with reference to FIGS. 5 to 7. Although this method is described with reference to the structure 210, it naturally applies to each of the structures 10, 110 described above.

A first step of the method consists of procuring a transport and hoisting kit, this kit comprising the two transport arms 214, 216, one of which 216 is connected to the hoisting arm 218.

In the case where the engine mounts 240 are not already secured to the turbine engine module, they are applied and fixed to the bosses on this module as described above.

Each transport arm 214, 216 is next connected to two engine mounts 240 situated on one side of the plane P, and then the turbine engine module 212 is positioned on the support carriage 226. The front carrier elements 232 of the carriage 226 cooperate with the transport arms 214, 216 and its rear carrier elements 232 cooperate with corresponding supports provided on a flange fixed to the rear end of the turbine engine module 212.

The structure 210 is thus installed on the turbine engine module 212, which is supported by the transport carriage 226, as shown in FIG. 5.

The carriage 226 is next moved to a required location from which the turbine engine module 212 is to be hoisted in order to put it at a given height.

A lifting member is next connected to the hoisting interface of the hoisting arm 218 and the turbine engine module 212 is hoisted in order to release it from the transport carriage 226.

The transport arm 214, which is not connected to the hoisting arm 218, is then removed and withdrawn from the turbine engine module 212, as shown in FIG. 6. This operation makes available the two engine mounts 240 that were connected to the arm 214. These two engine mounts 240 can be designed to remain fixed to bosses on the module after the removal of the arm 214.

The turbine engine module 212 is next hoisted by means of the lifting member, so that the engine mounts available are facing the lateral side of the fuselage of the aircraft on which the turbine engine is to be installed. As depicted in FIG. 7, the fuselage of the aircraft comprises a strut 250 that is connected by suitable suspension and fixing means 245 to the engine mounts 240 situated on the lateral side of the module where the transport arm 214 was situated. These engine mounts 240, which form engine interfaces 222, thus also form suspension interfaces able to cooperate with means 245 for suspending the module or turbine engine on the strut 250. The suspension means 245 may for example be similar to those described in the patent application published under the number FR-A1-2 965 796.

Once the turbine engine module 212 is fixed to the strut 250, the lifting member is detached from the hoisting interface, and the assembly formed by the transport arm 216 and the hoisting arm 218 can be removed and withdrawn from the module 212. The two engine mounts 240 that were connected to the arm 216 can be withdrawn from the module if their design so permits, which makes it possible to somewhat lighten the module and to reuse these engine mounts for another module. Naturally, providing engine mounts integrated in the module so that they cannot be removed can be envisaged. For example, the engine mounts may be fixed definitively to a flange of the turbine engine.

As an alternative, the two engine mounts 240 may be designed so as to be each incorporated in a transport arm 214, 216, and therefore do not remain fixed to the bosses on the module after the transport arm is withdrawn. Such a configuration corresponds to a transport arm for example such as the one depicted in FIG. 9, where the two engine mounts remain fixed to the arm. In this configuration, a boss on the turbine engine such as the boss 142 described previously in FIG. 4 can be considered to form an engine interface. Furthermore, the suspension means 245 are then designed so as to be connected to the corresponding two bosses either directly or by means of suitable support and fixing members.

Figure 8:
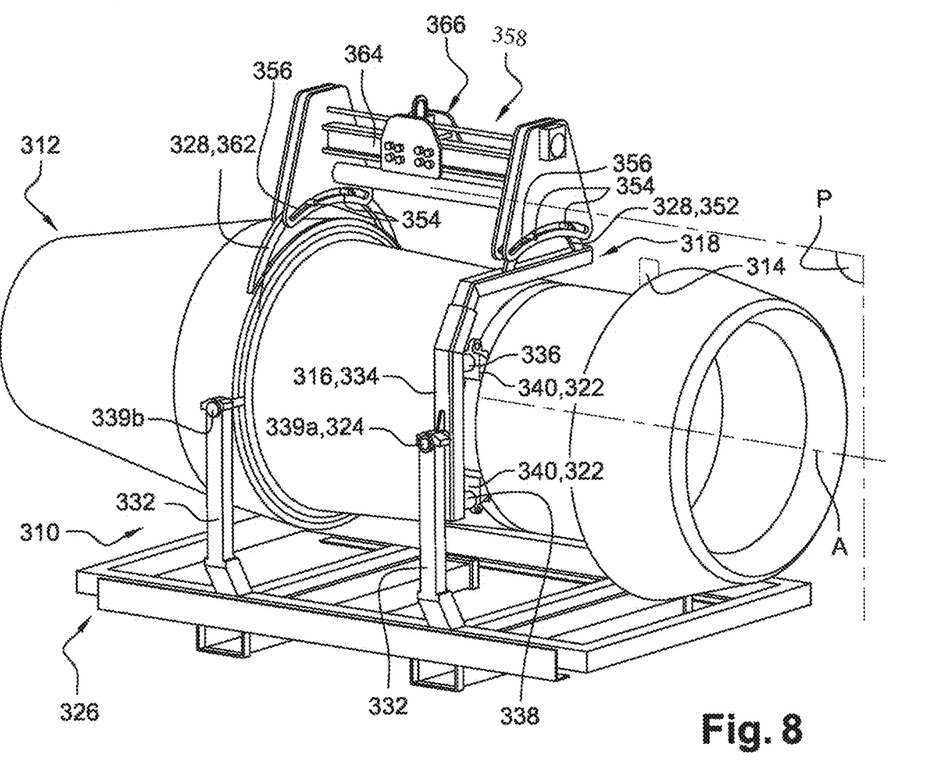
FIG. 8 is a schematic view in perspective of a turbine engine equipped with another variant embodiment of a transport and hoisting structure according to the invention, this structure cooperating with a carriage transporting the turbine engine.

Reference is now made to FIG. 8, which shows another variant embodiment of the transport and hoisting structure 310 according to the invention. Although only the transport arm 316 associated with the hoisting 318 is shown here, the structure also comprises a second transport arm 314 identical to the first transport arm 316, as described above.

Each transport arm 314, 316 comprises a substantially rectilinear main portion 334, the top and bottom ends of which are connected to cylindrical bars, respectively top 336 and bottom 338. The main portion 334 of each arm 314, 316 extends on one side of the turbine engine 312, substantially parallel to the plane P. The bars 336, 338 extend from the same side of the main portion 334 towards the turbine engine 312 and each form an angle of approximately 90° with the main portion 334. The bars 336, 338 are thus substantially parallel and extend substantially perpendicular to the plane P. They are similar to the aforementioned bottom and top rectilinear portions of the support arms in the embodiments described above.

The longitudinal end of each bar 336, 338, opposite to the main portion 334 of the arm 314, 316, is connected to an engine mount 340 that is fixed to the turbine engine 312. The turbine engine 312 may comprises bosses for fixing these engine mounts 340, as described above. These engine mounts 340 are situated in the zones where the transport arms of the structure 310 are connected to turbine engine 312, that is to say at the engine interfaces 322 described above.

The transport carriage 326 comprises two carrier elements 332 at the front and two carrier elements 332 at the rear. Each front carrier element 332 cooperates with a cylindrical bar 339a of a transport arm. This bar 339a is situated on one side of the main portion 334 of the transport arm, opposite to the one on which the bars 336, 338 are situated. The bar 339a forms an angle of approximately 90° with the main portion 334 and is thus substantially parallel to the bars 336, 338. This bar forms a transport interface 324.

Each rear carrier element 332 of the carriage 326 cooperates with another cylindrical bar 339b that is fixed for example detachably to the turbine engine 312, and which also forms a transport interface.

The hoisting arm 318 is fixed detachably to the transport arm 316 and comprises a substantially rectilinear portion that extends above the turbine engine 312, from the top end of the main portion 334 of the transport arm 316, and passes across the plane P.

The hoisting arm 318 is secured to a first arch 352 that lies in a substantially vertical plane and the concavity of which is oriented downwards, that is to say towards the turbine engine 312. The arch 352 is for example formed in a single piece with the rectilinear portion of the hoisting arm 318, or is formed by a piece fixed by bolting to said rectilinear portion as in the example depicted. This arch 352 carries fingers 354 that are oriented parallel to the axis A and are guided in curved grooves 356 in a first end element of a connection member 358.

A second arch 362 is also fixed to the turbine engine 312 and extends in a substantially vertical plane while having its concavity oriented downwards. The arches 352, 362 are at an axial distance from each other and form hoisting interfaces 328. The arch 362 also carries fingers 354 that are oriented parallel to the axis A and are guided in curved grooves 356 in a second end element of the connection member 358.

The grooves 356 in the end pieces of the connection member 358 are preferably identical and their radius of curvature is preferably centred on the axis A.

The connection member 358 comprises a longitudinal rail 364 that extends between the aforementioned two end pieces and is secured to these end pieces. The rail 364 extends parallel to the axis A, above the turbine engine 312. An attachment member 366 is mounted on the rail 364 so as to be able to be moved along the latter, this attachment member 366 comprising means for connection to a lifting member suitable for hoisting the turbine engine 312.

The method described above with reference to FIGS. 5 to 7 applies to the structure 310 in FIG. 8.

It can be seen that the turbine engine 312 in FIG. 8 is almost complete, only an external cylindrical cowling of the nacelle having been removed in order to allow connection of the strut to a structural element of the turbine engine 312.

In addition to the steps of the method presented above, it will be understood that the method can here comprise steps of adjusting the position of the turbine engine 312 vis-à-vis the strut on which the turbine engine 312 is intended to be fixed. The attachment member 366, which can be moved on the rail 364 of the connection member 358, thus makes it possible to position a ring of the attachment member 366 with an optional greater or lesser offset in the longitudinal direction with respect to the position of the centre of gravity of the turbine engine 312, which makes it possible to adjust the inclination of the axis A of turbine engine with respect to the horizontal. This property may be useful if the axis A is designed to form a certain angle with respect to the horizontal whilst the turbine engine is mounted on the aircraft strut. Moreover, the end pieces of the connection member 358, which can be rotated vis-à-vis the arches 352, 362 (by guidance of the fingers 354 of the arches in the grooves 356 of the end pieces), makes it possible to adjust the angular position of the turbine engine 312 about the axis A. The freedoms of adjustment of both the inclination of the axis A and the angular position of the turbine engine about this axis allow a precise positioning of the turbine engine for fixing the suspension elements of the turbine engine on the aircraft strut.

Figure 9:
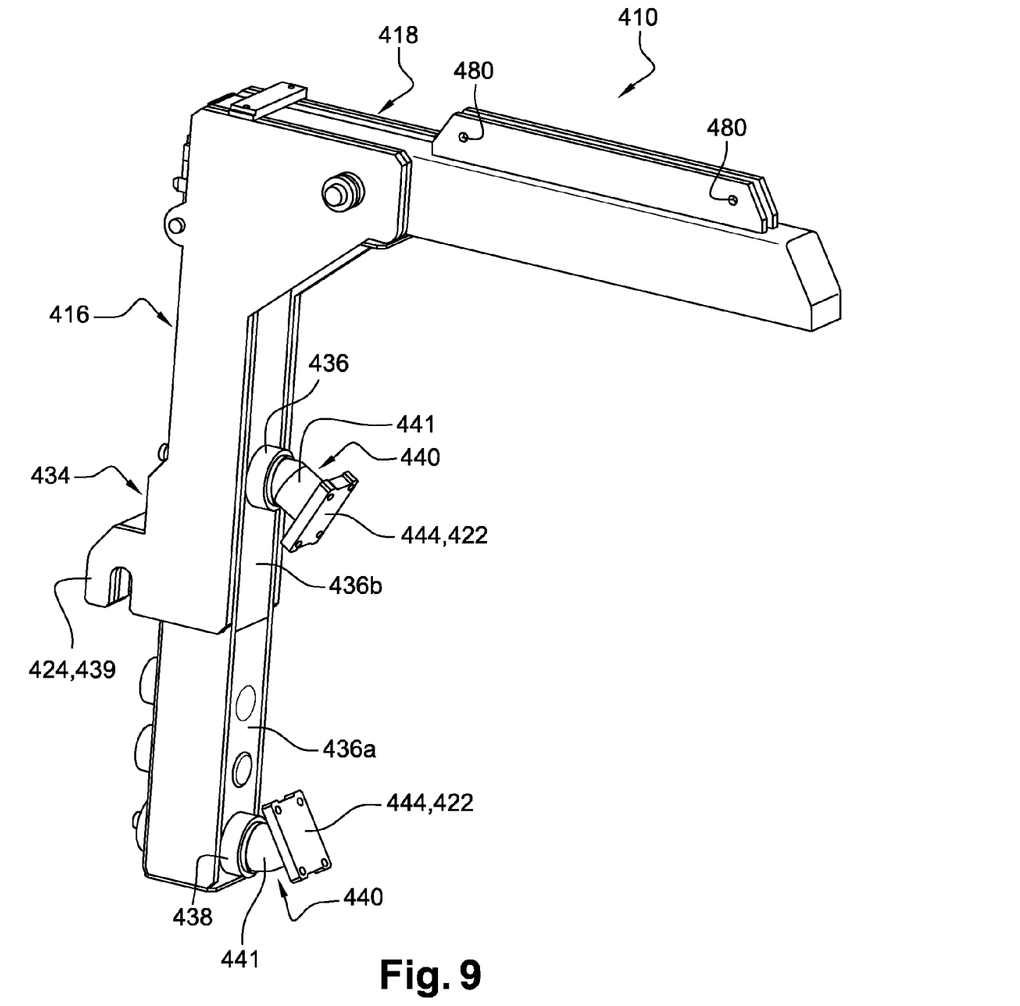
FIG. 9 is a schematic view in perspective of another variant embodiment of a transport and hoisting structure according to the invention.

Reference is now made to FIG. 9, which shows another variant embodiment of a transport arm and of a hoisting arm associated in a transport and hoisting structure 410 according to the invention.

The transport arm 416 comprises a substantially rectilinear main portion 434 and two relatively short rectilinear portions, respectively bottom 438 and top 436, forming portions of tubes parallel to each other that extend on the same side of the main rectilinear portion and each form substantially a right angle with this main part. As an alternative, a different angle may be envisaged so that the axes of the two rectilinear portions converge on the turbine engine side.

These two rectilinear portions, bottom 438 and top 436, are each connected to an engine mount 440 able to be secured to the turbine engine. Each engine mount 440 comprises an angled cylindrical bar, part of which is fixed to the bottom 438 or top 436 rectilinear portion and another part of which is formed by a cylindrical portion 441 that has one end secured to a plate 444 for fixing to a boss on the turbine engine. Each plate 444 forms an engine interface 422.

In the mounting position on the turbine engine, the main portion 434 of each arm 416 extends on one side of the turbine engine, substantially parallel to the aforementioned plane P. The engine supports 440 extend from the same side of the main portion 434 towards the turbine engine. The axes of the cylindrical portions 441 of the engine mounts 440 form between them an angle, for example less than or equal to 90°, and converge at the same point typically situated on the central longitudinal axis A of the turbine engine once the engine mounts 440 have been fixed to the turbine engine.

The main portion 434 of each arm 416 is here formed by two tubular profiles engaged one in the other, a bottom profile 436a (with a smaller cross section), a top end part of which is engaged in a bottom end part of a top profile 436b (with a larger cross section). The bottom profile 436a carries the bottom engine mount 440 at its bottom end. The top profile 436b carries the top engine mount 440 in the vicinity of its bottom end. This top profile 436b carries at its bottom end a hook 439 that forms a transport interface 424 intended to cooperate with a carrier element of a transport carriage, as described above.

The hook 439 has normally an L or U shape and defines an opening that is oriented downwards. This hook 439 is situated on one side of the main portion 434 of the transport arm 416, opposite to the one on which the engine mounts 440 are situated.

The hoisting arm 418 is fixed detachably to the transport arm 416 and comprises a substantially rectilinear portion that is intended to extend above the turbine engine, from the top end of the main portion 434 of the transport arm 416.

The hoisting arm 418 comprises at its top end orifices 480 for fixing an arch of the aforementioned type, for example identical to the arch 352 described with reference to FIG. 8, and which is intended to form a hoisting interface 428 (not shown). This arch is intended to extend in a substantially vertical plane, its concavity being oriented downwards, that is to say towards the turbine engine.

The transport and hoisting structure 410 advantageously further comprises a second transport arm 414 identical to the first transport arm 416, as described above with reference to FIG. 8, and which comprises a second transport interface 424 of the structure. As an alternative, in a similar fashion to the embodiment described with reference to FIG. 3, it is possible to dispense with the second transport arm 414, in which case it is possible to provide instead a bottom engine mount that comprises a transport interface able to be connected to a corresponding carrier element at the front of the transport carriage.

The method described above with reference to FIGS. 5 to 8 applies to the structure 410 in FIG. 9.

In the example embodiments described herein, the number of engine mounts connected to a transport arm is equal to two. The invention is however not limited to this configuration. For example, providing three engine mounts or even more on each lateral side of the turbine engine is not excluded, with a transport arm suitable for being connected to all the engine mounts on the same lateral side.

The invention claimed is:

1. A method for transporting and hoisting a turbine engine or a turbine engine module, in order to install the turbine engine or the turbine engine module on either of two lateral sides of a fuselage of an aircraft, the turbine engine or the turbine engine module comprising bosses for fixing at least four engine mounts that are symmetrical in pairs with respect to a vertical midplane (P) comprising a central longitudinal axis (A) of the turbine engine or the turbine engine module, the method comprising steps of:
  a) procuring a transport and hoisting kit, the transport and hoisting kit comprising at least two rigid transport arms that are each connectable to at least two of said engine mounts, each transport arm of the at least two rigid transport arms comprising a transport interface supportable by a carrier element of a transport carriage,
  one of the at least two transport arms further being connected to a rigid hoisting arm that comprises a hoisting interface able to be connected to a lifting member for hoisting the turbine engine or the turbine engine module,
  b1) fixing the at least two engine mounts to the bosses of the turbine engine, b2) connecting a first one of the at least two rigid transport arms of the transport and hoisting kit to the at least two engine mounts for being situated or on a same first side of the vertical midplane (P), the rigid hoisting arm being already connected or connectable to said first rigid transport arm, and b3) connecting a second one of the at least two rigid transport arms of the transport and hoisting kit to the at least two engine mounts being situated on a second side of the vertical midplane (P), step b1) being performed before or after steps b2) and b3),
  c) placing the turbine engine or the turbine engine module on the transport carriage, the transport interface of each of the at least two transport arms being supported by a carrier the carrier element of the transport carriage, and transporting the transport carriage as far as a location from which the turbine engine or the turbine engine module is to be hoisted,
  d) connecting a lifting member to the hoisting interface of the hoisting arm, and hoisting the turbine engine or the turbine engine module in order to release the turbine engine or the turbine engine module from the transport carriage,
  e) removing from the turbine engine or the turbine engine module the second rigid transport arm so as to make available corresponding bosses of said bosses on the turbine engine or the turbine engine module or the at least two engine mounts fixed to the corresponding bosses,
  f) hoisting the turbine engine or the turbine engine module by said lifting member, so that the corresponding bosses or the at least two engine mounts fixed to the the corresponding bosses are facing the lateral side of the aircraft fuselage on which the turbine engine or the turbine engine module is configured to be installed.

* * * * *